No. 792,882.

Patented June 20, 1905.

UNITED STATES PATENT OFFICE.

GEORGE L. DAVISON, OF CHICAGO, ILLINOIS.

REFRACTORY COMPOUND AND PROCESS OF MAKING SAME.

SPECIFICATION forming part of Letters Patent No. 792,882, dated June 20, 1905.

Application filed April 18, 1904. Serial No. 203,765.

*To all whom it may concern:*

Be it known that I, GEORGE L. DAVISON, a citizen of the United States, residing at Chicago, in the county of Cook and State of Illinois, have invented certain new and useful Improvements in Refractory Compounds and Processes of Making Same, of which the following is a specification.

This invention relates to an improved refractory composition and process of manufacturing the same.

The object of the present invention is to produce at a relatively low cost a refractory compound of a highly refractory nature and to provide a simple, practical, and economical process of producing such compound.

To the above ends the invention consists in the matters hereinafter described, and more particularly pointed out in the appended claims.

I have discovered that certain natural magnesia minerals may be combined with other minerals to produce a refractory composition which will have the characteristic of vitrifying and forming a solid durable mass under the action of heat. I have further discovered that the ingredients composing such compound may be cheaply and effectually combined in accordance with the process hereinafter described.

In carrying out my invention I take natural Grecian or Californian magnesite, which in this state is so friable under the action of heat as to be incapable of use to form bricks or masses of refractory material, and add thereto one or more fluxing minerals of relatively high refractory quality and which will combine with the magnesite to form a compound which will vitrify when subjected to a high temperature. I have found that silica in the form of ordinary sand and oxid of iron constitute suitable fluxes for the above purpose.

The proportions which I have found best suited to the production of my improved compound are as follows: natural white magnesite, ninety-five per cent.; oxid of iron, three and one-half per cent.; silica, one and one-half per cent.

In carrying out the process of making the compound I first reduce all of the ingredients to a pulverized or comminuted condition and then thoroughly mix the same while dry. I then pass the mixture through an ordinary rotary cement-kiln, wherein it is heated to a sufficiently plastic condition to form masses of clinker, it being understood that the mix in the rotary kiln is kept heated by blowing into the kiln either liquid or pulverized solid fuel in a well-understood manner. The clinker issues from the kiln in the form of masses of varying sizes and is then allowed to cool, after which I reduce the clinker to granulated or pulverized form by grinding or other suitable treatment. The composition thus prepared is useful in repairing or building up refractory structures, the granulated material possessing the property of fusing or vitrifying into a solid mass under the action of heat. It may therefore be simply applied in its dry state to the part which is to be built up or covered in case the location is such as to retain the material in position until fused, or it may be formed into bricks or blocks by the use of any suitable binder and vitrified either before or after it has been placed in its position in the refractory structure.

Inasmuch as some varieties of slag produced in the reduction of iron possess substantially the correct proportions of oxid of iron and silica without containing enough impurities to seriously impair the quality of the product, I sometimes employ slag in place of the oxid of iron and slag as separate ingredients. The slag or cinder derived from iron-heating furnaces is suitable for this purpose, provided the proportions of iron and silica are approximately those indicated in the formula above given. The process of producing the compound from magnesite and slag may be carried out in the same manner as above described.

I am aware that refractory compounds have heretofore been made of silica and calcined magnesia; but such compounds are not the equivalent of the compound constituting my present invention. A compound composed of magnesia and silica has a strong affinity for oxid of iron when brought to a fusing temperature, and for this reason a compound from which the oxid of iron is omitted is subject to a pronounced corrosive action when submitted to the action of the combustion within an iron-treating furnace, due, of course, to the unsatisfied chemical affinity of the compound.

I claim as my invention—

1. As a new article of manufacture, a refractory compound comprising magnesite, oxid of iron and silica combined in substantially the proportions set forth and reduced to clinker.

2. As a new article of manufacture, a refractory compound comprising white magnesite, oxid of iron and silica uniformly combined, reduced to a vitrified state and comminuted.

3. The process of making a refractory magnesite compound which consists in comminuting natural magnesite, silica and oxid of iron, mixing the ingredients in a dry state, burning the mixture to clinker and comminuting the clinker.

4. The process of making a refractory magnesite compound which consists in comminuting natural magnesite, silica and oxid of iron, mixing the ingredients in a dry state, burning the mixture to clinker in a rotary kiln and comminuting the clinker.

GEORGE L. DAVISON.

Witnesses:
ALBERT H. GRAVES,
FREDERICK C. GOODWIN.